Sept. 14, 1954
FRANK F. KAHN
NOW BY CHANGE OF NAME
FRANK KEITH FOREST
NESTING BASKET CARRIAGE
2,689,132
Filed Feb. 17, 1949
3 Sheets-Sheet 2
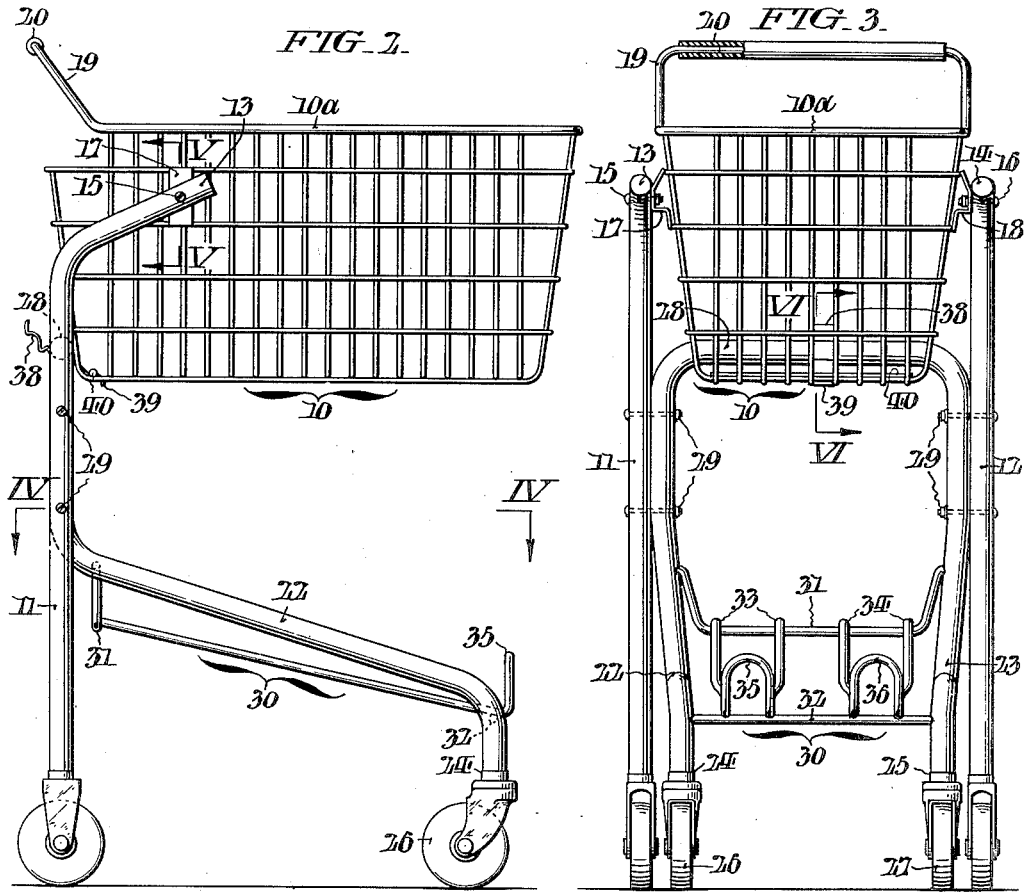
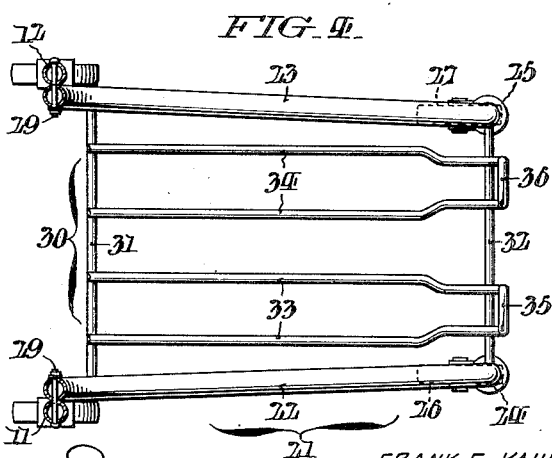
WITNESSES
INVENTOR:
FRANK F. KAHN NOW, BY CHANGE OF NAME, FRANK KEITH FOREST
BY
ATTORNEYS.

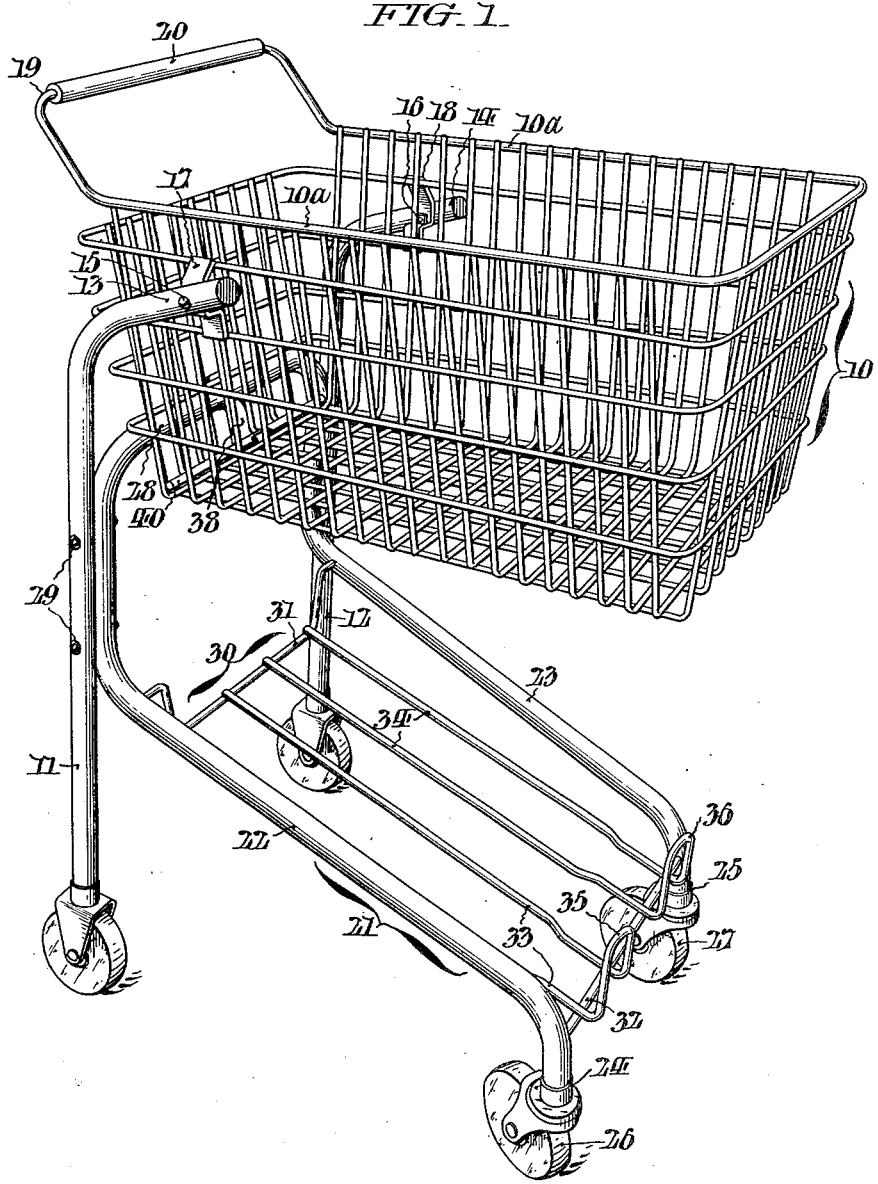

Sept. 14, 1954     FRANK F. KAHN     2,689,132
NOW BY CHANGE OF NAME
FRANK KEITH FOREST
NESTING BASKET CARRIAGE.
Filed Feb. 17, 1949     3 Sheets-Sheet 3
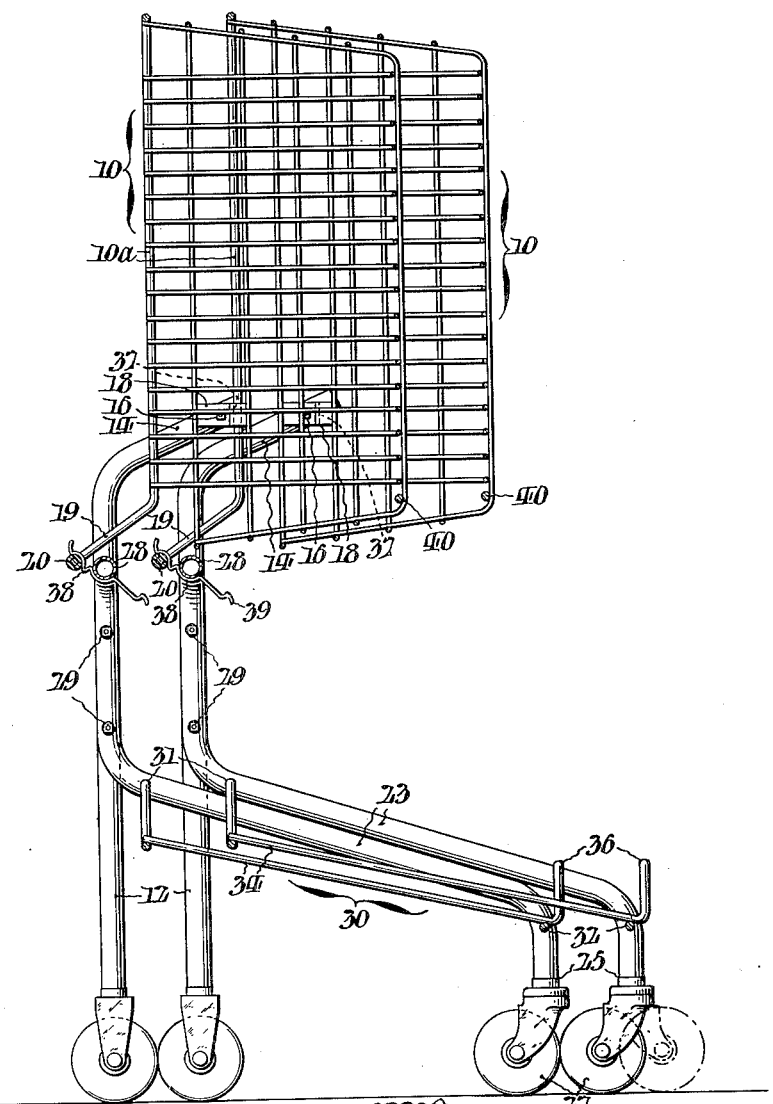

Patented Sept. 14, 1954

2,689,132

UNITED STATES PATENT OFFICE 2,689,132

NESTING BASKET CARRIAGE

Frank F. Kahn, Philadelphia, Pa.; now by change of name Frank Keith Forest, assignor to Sylvan N. Goldman Application February 17, 1949, Serial No. 77,013

3 Claims. (Cl. 280—33.99)

This invention relates to a new and improved basket carriage of the general type employed in self-service grocery stores and the like and more particularly to basket carriages which are capable of being nested together when not in use.

Basket carriages of various types have gone into extensive use in establishments such as self-service grocery stores, and while the carriages heretofore known have been reasonably satisfactory when employed in limited numbers, experience has shown that a serious storage space problem is created if a sufficiently large number of carriages is maintained to handle peak requirements. It has therefore been proposed to provide basket carriages which may be collapsed or folded flat and stacked when not in use. While such collapsible carriages reduce the area of storage space required, they introduce a number of undesirable complications in actual use since it is necessary to assign to store employees the job of collapsing, folding, stacking and assembling such carriages and the necessary baskets must be removed from the carriages and separately stored and then placed on the carriages when these are assembled for use.

I have provided a frame type carriage having a pivotally attached basket and constructed so as to form a combined basket and carriage structure which will nest within basket carriages similarly constructed when the baskets are rotated from the shopping position to the nesting position. It is thus possible to store the basket carriages of my invention in nested relationship without the necessity of removing the baskets or of folding or stacking the carriages. My improved basket carriage may thus be stored with the wheel members on the floor and since it is only necessary to swing the basket member from nesting position to shopping position, there is no assembly problem in taking the carrier from storage and putting it into condition for immediate use. I have also provided a lower shelf which acts as a positive carrier for bulk packages and at the same time serves as a guide during the nesting operation.

One object of the present invention, therefore, is to provide a basket carriage which may be stored in nesting relationship with other carriages of like construction in a reduced space without resort to collapsing and stacking.

A further object of the present invention is to provide a basket carriage having a pivoted, horizontally positioned basket adapted to being rotated to a nesting position.

A still further object of the present invention is to provide a self-service store basket carriage having a pivoting basket and a supporting lower shelf frame constructed and arranged to provide guiding action in the nesting of said carriage with a second carriage of similar construction.

A further object of the present invention is to provide a carriage with an integrally attached, pivoting basket built so that the entire construction may be easily assembled or disassembled.

Further objects and advantages of the present invention will appear from the detailed description of a preferred embodiment thereof which follows, reference being had to the drawings in which:

Fig. 1 is a perspective view of my novel basket carriage.

Fig. 2 is a side elevation of the same.

Fig. 3 is a front end elevation looking from left to right in Fig. 2.

Fig. 4 is a plan sectional view of the frame and lower shelf elements of the present invention taken as indicated by the lines and arrows IV—IV in Fig. 2.

Fig. 5 is a fragmentary transverse sectional view of the basket hinge taken as indicated by the lines and arrows V—V in Fig. 2.

Fig. 6 is a fragmentary longitudinal sectional view of the basket retaining means taken as indicated by the lines and arrows VI—VI in Fig. 3.

Fig. 7 is a longitudinal sectional view showing two basket carriages nested into each other.

In the preferred embodiment illustrated in the drawings basket 10 is pivotally mounted on a carriage frame of angular configuration having vertical rear frame members 11 and 12 which may be constructed of metal tubing. Frame members 11 and 12 have forwardly projecting arms 13 and 14 formed by bending the tubing of members 11 and 12 to the configuration shown in Figs. 1 and 2. Pivot bolts 15 and 16 are positioned in holes provided adjacent the end portions of arms 13 and 14 and pass through basket supporting brackets 17 and 18 which are welded or otherwise attached to baskets 10 and which are provided with a special offset portion to facilitate nesting as illustrated in Fig. 5. A handle 19 is provided integral with basket 10 and serves in the dual capacity of a means for moving the basket carriage from place to place when the basket 10 is in the normal use position of Figs. 1 and 2, and for swinging basket 10 to the nesting position of Fig. 7 and retaining it there when it is desired to store the carriage in nesting relationship with other carriages of similar construction. Handle covering element 20, which may be of colored plastic material or the like, is provided for convenience in pushing the basket carriage from point to point and for quick identification of the proper grasping element for operation of the carriage either for pushing or for the pivoting of the basket 10.

The supporting frame of the carriage is of angular configuration as shown in Fig. 1, and in addition to the upright rear frame members 11 and 12 includes a lower shelf supporting frame member comprehensively designated 21 having converging sides 22 and 23 which extend downwardly and forwardly from points located part way up vertical frame members 11 and 12 and which terminate at their lower ends in supports 24 and 25 for casters 26 and 27. At its upper end, supporting frame member 21 is provided with horizontal cross member 28 which serves to strengthen frame member 21 and at the same time provides a spacing and strengthening element for rear frame members 11 and 12 to which supporting frame member 21 is attached by means of fastening elements 29. Cross member 28 also provides an abutment support for basket 10 across the lower back portion thereof when the basket is in its normal use position, see Figs. 2 and 6.

Attached to frame member 21 is lower shelf 30 which is made up of cross support elements 31 and 32 to which are attached a pair of elongated U-shaped elements 33 and 34 terminating in upturned guide members 35 and 36. Cross support elements 31 and 32 are attached to frame elements 22 and 23 in such a way as to provide an open shelf support which slopes downwardly toward the front of the carriage and which is positioned below supporting frame elements 22 and 23. The sloping shelf thus formed is therefore especially adapted to carrying and positively retaining medium to large size packages which are prevented from slipping off the rear of the shelf because of the forward slope and which are retained at the front of the carriage by the upturned guide and retaining members 35 and 36. At the same time frame elements 22 and 23 serve as side retaining elements for such packages.

In addition to forming a carrying shelf having the special advantages referred to above, the U-shaped elements 33 and 34 provide a positive guiding action in the nesting of a similar carriage having upturned guide members corresponding to elements 35 and 36 which project upwardly through the open portions of the U-shaped members 33 and 34 and are thus guided and held in the desired nesting position as shown in Fig. 7. Through the action of guide elements 35 and 36 and brackets 17 and 18 contact between nested carriage is reduced and deterioration of the finish is thus minimized. It will also be noted that the downward slope of the lower shelf not only serves to prevent the loss of packages from this shelf but also makes it possible to nest an unlimited number of basket carriages constructed according to my invention in a wheel to wheel nesting relationship as illustrated in Fig. 7.

As shown in Fig. 5 the supporting bracket 17 is constructed with an angular offset portion 37 which provides a nesting opening and stop for the top member 10a of basket 10 when the baskets are pivoted to a nesting position as shown in Fig. 7. A similar construction is provided for bracket 18 as shown in Fig. 1. Brackets 17 and 18 may be so positioned as to provide a very slight clearance for the wheels when the carriages are nested. This arrangement is desirable since it is necessary to move the carriages around in nested groups.

It is desirable to provide means for positively retaining the basket 10 in nesting position so as to avoid undue wear of the baskets and to eliminate any possibility of difficulty in removing the basket carriage from a nested position. Spring retaining means 38 is therefore provided for engagement with handle 19 when basket 10 is pivoted to the nesting position. Handle 19, being integral with basket 10, therefore serves in the pushing of the carriage, in pivoting the basket and in holding the basket in nesting position. The basket 10 may also be firmly held in the position of normal use by means of an extension 39 of spring 38 which engages cross bar 40 as shown in Fig. 6. It will also be noted that cross bar 40 serves to strengthen basket 10 across the lower portion of the back section in the vicinity of the abutment area defined by the contact of basket 10 with cross element 28 when basket 10 is in shopping position.

As will be seen from the drawings and from the above description, the present invention provides a basket carriage which can be easily changed from a normal, non-nesting configuration to a nesting configuration, with the change requiring no special skill or effort. It should also be noted that the removal of the six assembly bolts 15, 16 and 29 is all that is required for disassembling the basket carriage of the present invention for shipment or for long periods of storage where it is not desired to maintain the carriages in nested relationship.

It is contemplated that a relatively large number of substantially identical basket carriages constructed according to the present invention would be used in a self-service food store and that such basket carriages when not in use would be stored in nesting relationship at a suitable location within the store. A customer desiring to use one of the basket carriages merely grasps the covering of the handle, suitably colored for identification, and by lightly pulling on the handle disengages the carriages from the adjoining carriage. Such disengagement would be particularly easy in view of the guiding action resulting from the engagement of the upturned guides 35 and 36 with the U-shaped channels 33 and 34 of the adjoining carriage. Following this disengaging action the customer then pulls upwardly on handle 19 or disengages spring 38 thus making it possible to rotate basket 10 to a horizontal position and in the position then assumed by handle 19 it is ideally located for pushing the basket carriage from point to point within the store. After the basket carriage has served its purpose in transporting articles of purchase through the store and to the checking counter, the basket 10, having been emptied at the checking counter, is rotated to a nesting position by pushing down on handle 19 until engagement is made with spring 38. In this position the carriage is then pushed into nesting engagement with the end carriage of those being stored in such a way that guide elements 35 and 36 engage the openings of U-shaped elements 33 and 34. This is made possible by the fact that the tops of guide elements 35 and 36 are lower than the cross support element 31 of the adjoining carriage. The basket carriage is thus returned to storage ready for re-use and in this condition takes up a minimum of storage space.

While I have described the present invention in terms of a preferred embodiment, it will be apparent that various changes can be made in design and construction without departing from the novel contribution embodied in the present invention. For instance, while a basket which can be pivoted from a normal use position to a nesting position is fundamental to the present invention, the particular vertical nesting position shown in the drawings could be modified and likewise a different direction or axis of rotation could be selected. It will likewise be apparent that the pivoting basket may be mounted in a variety of ways without departing from the spirit of the invention.

Similarly, the lower shelf construction, which holds the bulkier merchandise and protects it from falling by means of its forward slope and retaining members on three sides in the direction of slope, and which also serves as the guiding element in nesting, could be constructed in a variety of ways without departing from the spirit of the invention.

Having thus described my invention, I claim:

1. In a basket carriage, a frame of angular configuration, a basket pivotally mounted on said frame and having sides converging toward the bottom thereof, a handle integral with said basket, abutment means integral with said frame and constructed and arranged to provide a stop for said basket in the normal use position, retaining means for engagement with said handle when the basket is pivoted to an upright position, forwardly and downwardly extending frame members converging inwardly toward each other, a downwardly inclined shelf mounted on said frame, and upwardly extending retaining and guide elements at the lower end of said shelf, said basket carriage being characterized by the fact that it will nest within a basket carriage of like construction.

2. In a nesting basket carriage for self-service stores or the like, a frame of angular configuration, a basket mounted on said frame, a lower shelf support including forwardly and downwardly extending frame elements, an open shelf mounted on said shelf support, spaced forwardly and downwardly extending supporting elements forming a part of said open shelf defining openings between said spaced elements, upwardly extending retaining elements positioned at the forward end of said open shelf, said retaining elements being narrower than the openings between the spaced elements and projecting upwardly sufficiently far to engage openings similarly defined in a second carriage as said carriages are brought into nesting relationship.

3. In a nesting basket carriage for self-service stores or the like, a frame of angular configuration, wheels supporting said frame, a basket mounted on said frame, an open shelf mounted on said frame, spaced forwardly and downwardly extending supporting elements forming a part of said open shelf and defining openings between said spaced elements, said supporting elements being connected at their outer ends by upwardly extending loops, said loops being narrower than the rear portion of the openings between the spaced elements, and projecting upwardly sufficiently far to be positioned within openings similarly defined in a second carriage of similar construction as said carriages are brought into nesting relationship.

References Cited in the file of this patent

UNITED STATES PATENTS

| Number | Name | Date |
| --- | --- | --- |
| D. 155,971 | Concklin | Nov. 15, 1949 |
| 669,368 | Melton | Mar. 5, 1901 |
| 1,816,411 | Tillinger | July 28, 1931 |
| 2,155,896 | Goldman | Apr. 25, 1939 |
| 2,234,358 | Schray | Mar. 11, 1941 |
| 2,422,862 | Stottrup | June 24, 1947 |